United States Patent
Potucek (12)

(10) Patent No.: US 6,275,634 B1
(45) Date of Patent: Aug. 14, 2001

(54) FIBER OPTIC PERIMETER LIGHTING SYSTEM

(75) Inventor: Kevin L. Potucek, Simi Valley, CA (US)

(73) Assignee: PAC-FAB, Inc., Los Angeles, CA (US)

(*) Notice: Subject to any disclaimer, the term of this patent is extended or adjusted under 35 U.S.C. 154(b) by 0 days.

(21) Appl. No.: 09/193,331

(22) Filed: Nov. 16, 1998

(51) Int. Cl.[7] ............................. G02B 6/04; G02B 6/06; G02B 6/44

(52) U.S. Cl. .................... 385/115; 385/116; 385/100; 385/901; 362/554; 362/576

(58) Field of Search .................................... 385/115, 116, 385/100, 901, 102; 362/147, 101, 576, 551, 559, 562, 554

(56) References Cited

U.S. PATENT DOCUMENTS 5,680,496 * 10/1997 Burkitt, III et al. ................. 385/100
5,980,076 * 11/1999 Dunn et al. ........................... 362/101

* cited by examiner

Primary Examiner—Frank G. Font
Assistant Examiner—Amanda Merlino
(74) Attorney, Agent, or Firm—Pearne & Gordon LLP

(57) ABSTRACT

A fiber optic pool lighting system includes a light adaptor cap having an open mouth adapted to be positioned over a pool wall light source. A flexible fiber optic cable bundle having an end mounted in an opening in the cap is provided so that the end is in substantial axial alignment with the light source. A rail adaptor attaches the cable bundle to the top rail of an above-ground pool and the cable is branched from the adaptor and around the perimeter of the pool.

24 Claims, 4 Drawing Sheets

FIBER OPTIC PERIMETER LIGHTING SYSTEM

BACKGROUND OF THE INVENTION

This invention relates generally to lighting systems for swimming pools and, more particularly, to fiber optic cable assemblies that are mounted along the perimeter of above-ground swimming pools.

Submersible electric lights for the illumination of swimming pools and spas have become well known over the years. More recently, it has become popular to use fiber optic cables in swimming pool lighting systems. Fiber optic systems consist basically of a remote light source and either or a combination of two types of fiber optic cable namely end light or side light cable. End light fiber optic cable is designed to emit light from the end of a fiber opposite the light source to either provide a directly viewed point of light or to cast illumination upon an area. Side light fiber optic cable, with a clear or translucent jacket, takes advantage of light escaping from the side of the fiber or bundled fibers to deliver an effect similar to neon light for direct viewing.

One example of side light fiber optic perimeter lighting may be found in U.S. Pat. No. 5,680,496. That patent sets forth a perimeter lighting assembly which is mounted in a track around the pool periphery. The fiber optic cable assembly includes a bundle of fiber optic fibers, a tube, a track, a plurality of fasteners and securing means. The tube has a front surface and a rear surface and the bundle of fiber optic fibers is contained within the tube. The tube has flanges which fit within the track and fasteners are employed to secure the track to the side of the pool.

This arrangement is suitable for in-ground pool lighting but does not adapt well to above-ground installations because of the expense of a system effective in delivering adequate under water (end-out) and perimeter (side-out) illumination. Part of this expense is due to the cost of the fiber optic cable between its remote light source and the pool wall. Because there is a natural loss of light over distance in fiber optic cable, the fiber optic cable required between a remote light source and the pool also reduces the amount of light transmitted, reducing the light efficiency of the system. Another part of this expense is due to the large fiber cable or powerful remote light surface required to provide adequate under water illumination. Dark surfaces are more difficult to effectively illuminate then lightly colored surfaces and only very expensive fiber optic systems deliver acceptable or adequate under water illumination of darker surfaces. The vast majority of above ground pools have dark liners or liners with dense, dark, printed patterns.

SUMMARY OF THE INVENTION

This invention provides a perimeter lighting system which delivers adequate under water illumination and economical perimeter (side-out) fiber optic illumination by using a submersible incandescent light fixture for direct under water illumination as well as for the light source for the fiber optic cable for perimeter and other fiber optic features in the pool environment.

The invention also provides adequate direct under water illumination while at the same time provides a light source for fiber optic fibers and/or fiber optic cable is for functional and/or aesthetic illumination in the pool environment.

According to this invention, a fiber optic pool perimeter lighting system is provided for an above-ground pool having a pool wall and a top perimeter mounted on the pool wall. The system comprises an above-ground pool light fixture mounted in the pool wall below the water level. The light fixture is preferably of the type set forth in U.S. Pat. No. 5,207,499 and includes an outer shroud having an inlet passage for inlet pool water. A concentric water proof tube is mounted within the shroud to house the electrical connections and a light fixture. The light fixture is covered by a lens and the shroud terminates in an annular grid which serves to admit water to the pool. A light adapter cup is mounted between the light fixture lens and the grid so that the cup locates fiber ends in the optimum or near optimum light focus spot of the light fixture. The cup has a side wall and an end wall and a flexible fiber optic cable bundle has an end mounted in an opening in the end wall so that the fiber optic cable bundle end is in substantial axial alignment with the light source. A rail adapter is mounted on the top perimeter of the pool. The rail adapter is a U-shaped channel having a base portion and a pair of parallel legs extending upwardly to engage a downwardly extending flange lip of the top perimeter. A hollow flexible tube case is connected at one end to the opening in the cap and is connected at its other end to the base portion of the rail adapter. The flexible fiber optic cable bundle has a first and a second branch leg extending as a unit from the opening in the end wall of the cap, through the tube case, into the U-shaped channel, and branching individually along the flange lip in opposite directions. Any excess cable may be retained by a similar U-shaped channel.

The fiber optic cable bundle according to this invention includes a flat flexible ribbon having an integral tube formed along one edge of the ribbon and a multiplicity of individual fiber optic fibers longitudinally extending in the tube. This arrangement provides a flat flexible tail which allows the cable to be fixed to the perimeter rail by an adhesive to the rearward side of the downwardly extending flange lip on the top perimeter rail. The tail may also be stapled to wooden deck structures. By allowing the cable tail and adhesive to be out of view, the adhesive does not have to have a smooth clear finish. This results in simpler installation by an untrained consumer.

The flexibility of the tail allows the tail to conform to the many diverse shapes of the underside of an above ground pool ledge. This flexibility also allows for conforming to and around irregularities in above-ground pool rail connections and corners on spa cabinets without kinking the fiber optic cable. Such kinking would cause undesirable bright spots and inhibit further light transmission in the fibers. Since the cable according to this invention, is designed with a loose fitting jacket or tube surrounding the multiple small polymethyl methacrylate fibers, the cable is able to conform to the above mentioned surface irregularities without creating bright spots or hindering continued light transmission. The fiber accommodates a 0.24 inch bend radius and the cable allows a 0.5 inch bend radius without kinking.

A further aspect of this invention includes a color wheel within the light collecting cup which contains color filters capable of changing the color of the fiber optic features. Existing technology which employs fiber optics for in-ground swimming pools utilizes a light source and a fiber-locating mechanism which is located in an air environment. The index of refraction of water is closer to that of glass and/or plastic than it is to the index of refraction of air. By passing light from the light source to glass or plastic color filter to fiber optics in a water environment rather than air, less light is lost as it passes from the light source to the color filter, to the fiber. The light saved in this transmission benefits the system by improving the amount of light emitted from the sides and/or end of the fiber optics. Thus, the invention utilizes a water environment to reduce light loss in the transmission of light between any two optical components of the fiber optic system.

DETAILED DESCRIPTION OF THE INVENTION

Figure 1:
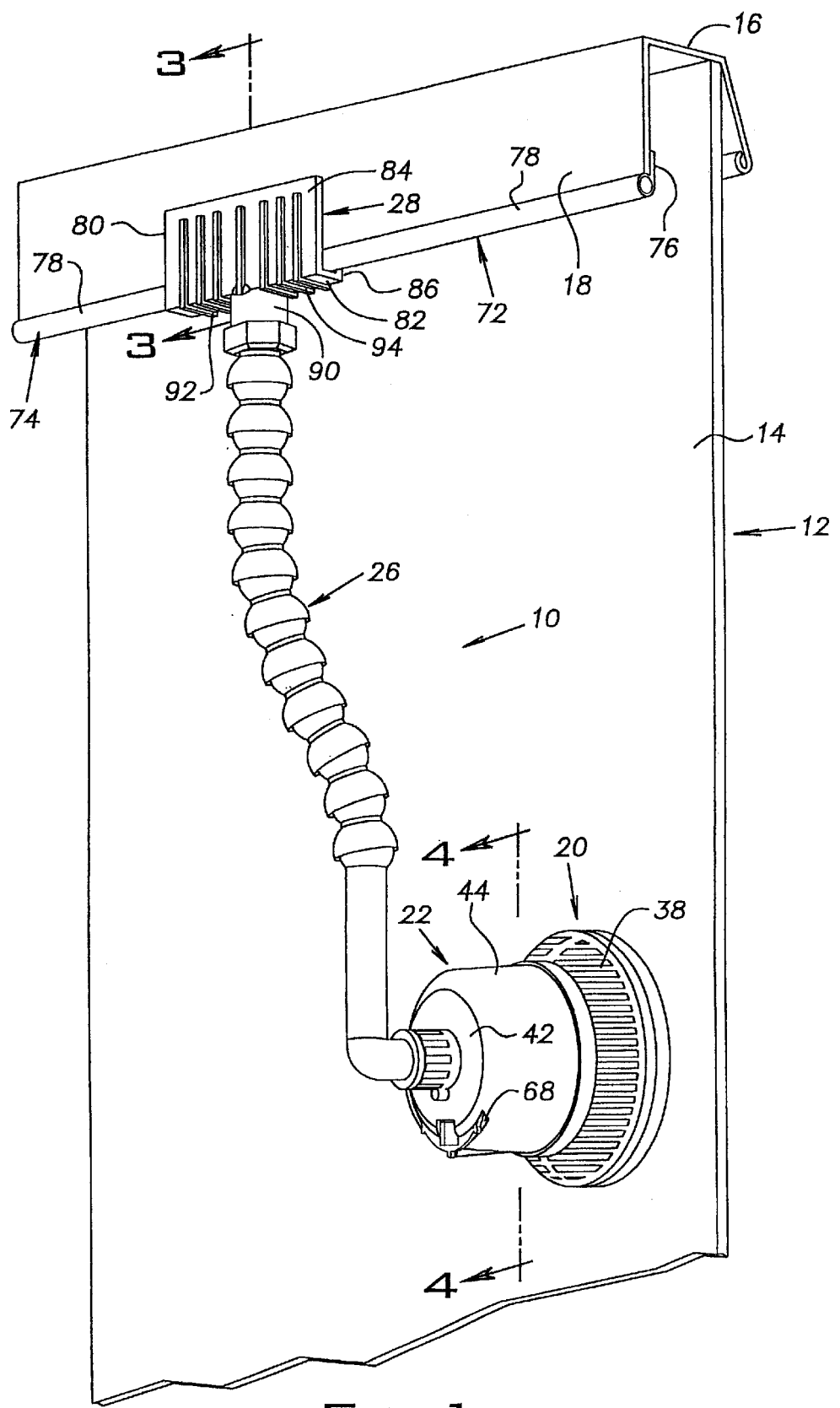
FIG. 1 is a fragmentary perspective view of an above-ground pool having a perimeter lighting system according to this invention.

Referring now to the drawings and, particularly, to FIG. 1 there is illustrated a perimeter lighting system 10 according to this invention. The lighting system 10 is adapted for use with and above-ground swimming pool 12. The swimming pool 12 has a side wall 14 and a top perimeter 16 which is provided with a downwardly extending flange lip 18.

The system 10 includes a pool light fixture 20, a light adapter cap 22, a flexible fiber optic cable bundle 24 (FIG. 4) received within a hollow flexible tube case 26, and a rail adapter 28.

Figure 4:
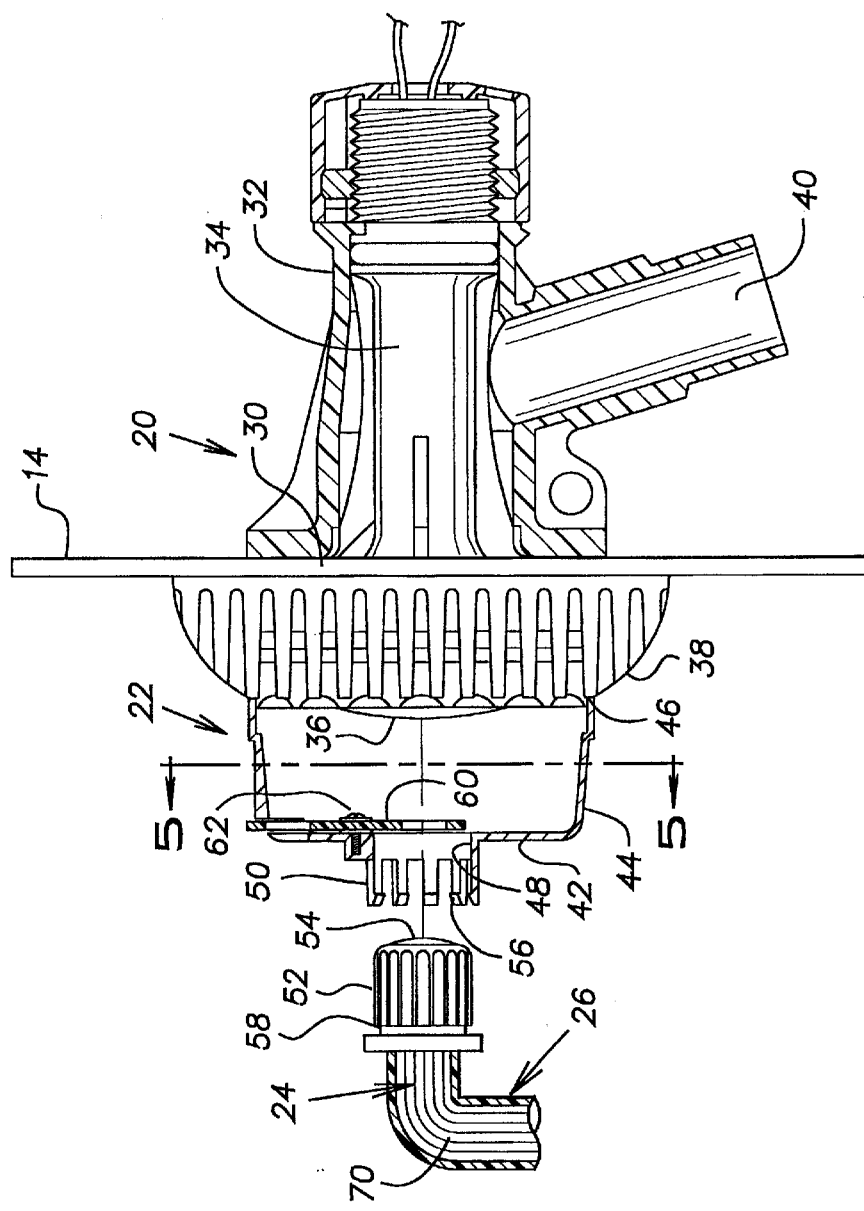
FIG. 4 is a sectional view, the plane of the section being indicated by the line 4—4 in FIG. 1.

Referring now to FIG. 4 the pool light fixture 20 is preferably of the type set forth in U.S. Pat. No. 5,207,499 and is adapted to be mounted through an opening 30 in the pool wall 14. The opening 30 is provided by the pool manufacturer as a location for a water inlet source to the pool. The lighting fixture 20 includes an outer shroud 32 and a concentrically mounted bulb mounting assembly 34. The pool side of the bulb mounting assembly 34 has a lens 36 which projects into the pool side of the wall 14 and lens is surrounded by a flow director 38. A wall flange (not shown) mounts the bulb assembly 34 and the shroud 32 in their illustrated position in the opening 30. A water flow inlet passage 40 admits pool inlet water to the annular space between the shroud 32 and the bulb assembly 34 and permits that water to flow through the flow director 38 and around the lens 36.

The light adapter cap 22 has an end wall 42 and a side wall 44. The rim of the side wall 44 fits into a groove 46 provided between the lens 36 and the flow director 38. The end wall 42 defines an axial opening 48 which is further defined by a plurality of fingers 50. The flexible fiber optic cable bundle 24 has an end terminated by an adapter cap 52 provided with a lens 54. The adapter cap 52 is received within the opening 48 and is releasably retained therein by barbs 56 which snap over a rim 58 of the adapter 52.

A color wheel 60 is rotatably mounted between the light source and the lens 54. The color wheel 60 is rotatably mounted on a pin 62 which is affixed to the end wall 42. The color wheel 60 has a plurality of differently colored lenses 64 positioned about its perimeter and the lenses 64 alternate with openings 66. The color wheel 60 projects through an arcuate slot 68 in the side wall 44 to permit the color wheel 60 to be manually indexed so that a particular colored lens is interposed between the light source and the lens 54. The openings 66 permit untinted light to be similarly projected. The light is thereby transmitted by fibers 70 in the bundle 24.

Figure 3:
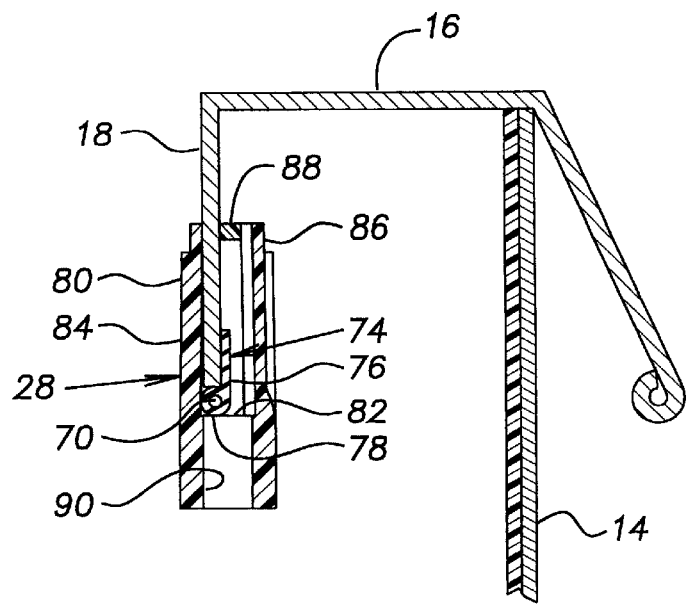
FIG. 3 is a sectional view, the plane of the section being indicate- by the line 3—3 in FIG. 1.

The bundle 24 includes the fibers of first and second branches 72 and 74 (FIG. 1) as may be seen in FIGS. 1 and 3 a cable branch is comprised of a flat flexible ribbon 76 having an integral tube 78 formed along one edge of the ribbon 76. The individual optic fibers 70 are contained in the tube 78. The flat ribbon and tube are preferably formed from light transmitting polyvinylchloride and may be either translucent or transparent. The individual fibers 70 are preferably polymethyl methacrylate having a diameter of less than 0.1 inch and preferably 0.3 inch. The flat flexible ribbon and its tube have a bend radius of less than 0.8 inch and, preferably, 0.24 inch.

The fiber bundle extends from the adapter lens 52 within the hollow flexible tube case 26 to the top rail adapter 28. That portion of the bundle 24 which extends through the tube case 26 has its flat ribbon or tail portion cut away so that only tubular portions 78 are within the tube case 26. As may be seen in FIGS. 1, 2, and 3 the top rail adapter 28 comprises a U-shaped channel 80 having a base portion 82 and a pair of parallel legs 84 and 86 extending upwardly from the base 82. The rail adapter 28 is fixed to the flange 18 by driving wedges 88 between the leg 86 and the flange 18. The flexible tube case 26 is received in a cable port opening 90 in the base 82 and the cable bundle is branched into the branch legs 72 and 74 along the bottom of the channel so that the flexible ribbon 76 is positioned behind the flange 18 while the tube 78 extends along the lower edge of the flange 18 in an exposed position. Silicone is injected into silicone ports 92 and 94 in the base 82 to firmly retain the top rail adapter 28 on the flange 18. Silicone and/or other adhesive is provided on the ribbon 76 to adhere each branch 72 and 74 to the flange 18. The branches 72 and 74 may be retained in this position by clothespin clamps at relatively short intervals along the flange 18. These clamps are removed after the silicone has set.

Figure 2:
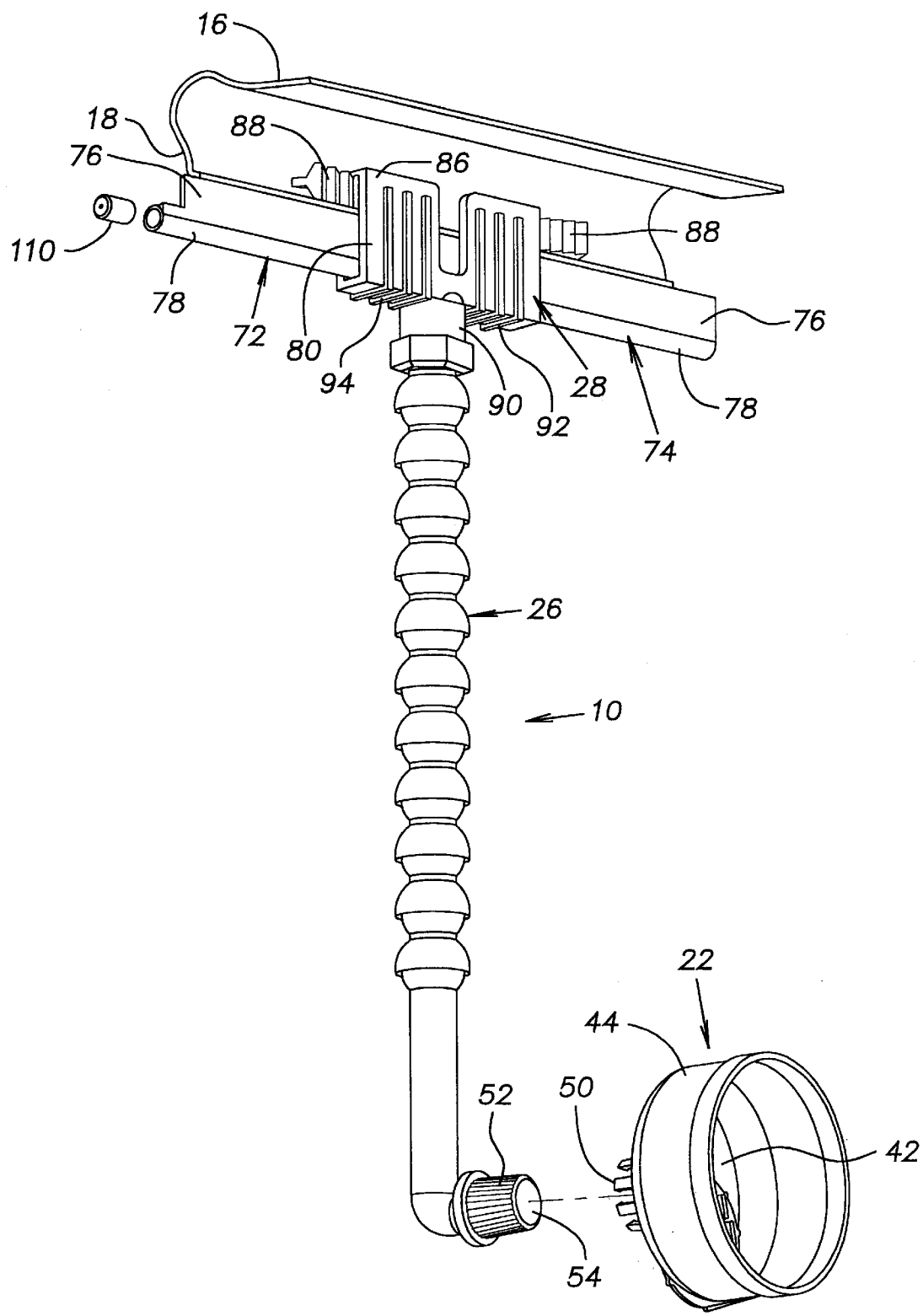
FIG. 2 is a fragmentary perspective view of a top rail and perimeter lighting assembly with the assembly viewed from the pool wall.
Figure 5:
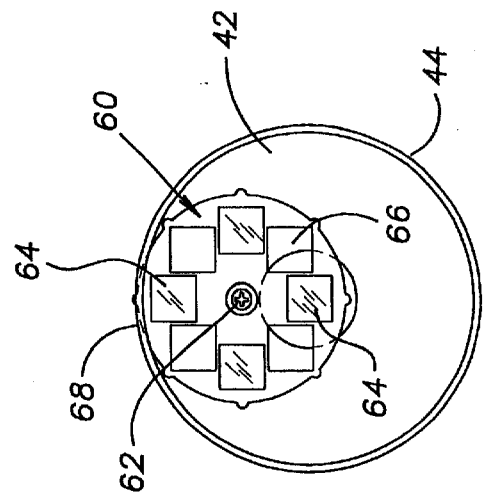
FIG. 5 is a sectional view, the plane of the section being indicated by the line 5—5 in FIG. 4.
Figure 6:
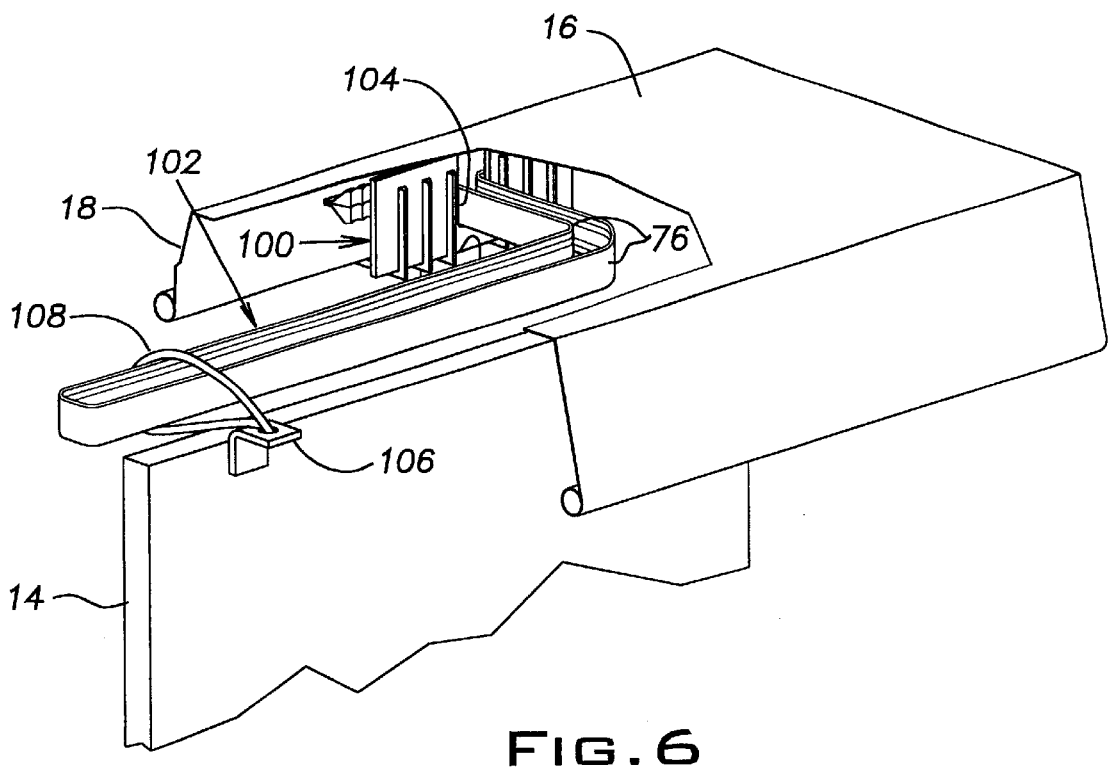
FIG. 6 is a fragmentary perspective view illustrating the arrangement of excess cable according to this invention.

As may be seen in FIG. 6, a top rail adapter 100 may be clamped to the flange 18 at a point opposite the location of the top rail adapter 28 and excess cable 102 may be looped upon itself and pulled through a slot opening 104 in the top rail adapter. The looped excess cable material may then be attached to the pool wall by a retaining clip 106 and a cable tie 108 to store the loop in an out of the way position. In the event that the branch legs 72 and 74 do not form a continuous loop those legs may be individually terminated by a lens cap 110 (FIG. 2).

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A fiber optic pool lighting system comprising a light adapter cap having an open mouth adapted to be positioned over a pool wall light source, a flexible fiber optic cable bundle having an end mounted in an opening in said cap so that said end is in substantial axial alignment with said light source, and a rail adapter positioned on said bundle for attaching the cable bundle to a top rail of a swimming pool.

2. A lighting system according to claim 1 wherein a hollow flexible tube case is connected at one end to said opening in said cap and is connected at another end to said rail adapter, said bundle extending through said flexible tube case.

3. A lighting system according to claim 1 wherein a color wheel is rotationally mounted in said cap, said color wheel having a plurality of arcuately spaced colored lenses which are selectively positioned at said opening upon rotation of said wheel.

4. A lighting system according to claim 1 wherein said fiber optic cable bundle includes a flat flexible ribbon having an integral tube formed along one edge of the ribbon and a multiplicity of individual fiber optic fibers longitudinally extending in said tube.

5. A lighting system according to claim 4 wherein said flat ribbon and tube are light transmitting PVC.

6. A lighting system according to claim 5 wherein said light transmitting PVC is translucent.

7. A lighting system according to claim 5 wherein said light transmitting PVC is transparent.

8. A lighting system according to claim 4 wherein said fibers are polymethyl methacrylate having a diameter of less than 0.1 inch.

9. A lighting system according to claim 8 wherein said fibers have a diameter of 0.03 inch.

10. A lighting system according to claim 8 wherein said flat flexible ribbon has a bend radius of less than 0.8 inch.

11. A lighting system according to claim 9 wherein said flat flexible ribbon has a bend radius of 0.24 inch.

12. A fiber optic pool lighting system for an above-ground pool having a pool wall and a top perimeter mounted on the pool wall comprising an above-ground pool light fixture mounted in the pool wall, a light adapter cap comprising an end wall and a side wall, a flexible fiber optic cable bundle having an end mounted in an opening in said end wall so that said end is in substantial axial alignment with a light source in said pool light fixture, a rail adaptor mounted on the top perimeter, said top perimeter including a downwardly extending flange lip and said rail adaptor comprising a U-shaped channel having a base portion and a pair of parallel legs extending upwardly from said base and engaging said flange, a hollow flexible tube case connected at one end to said opening in said cap and connected at another end to said base portion of said rail adaptor, said flexible fiber optic cable bundle having a first and second branch legs extending as a unit from the opening in said end wall, through said tube case, into said U-shaped channel, and branching individually along said flange lip in opposite directions to provide lighting along the pool perimeter.

13. A lighting system according to claim 12 wherein said first and second legs form a closed loop around the perimeter of said pool.

14. A lighting system according to claim 13 including a cable storage fixture mounted on said top perimeter at a location spaced from said rail adaptor, said cable storage fixture comprising a U-shaped channel having a base and a pair of parallel legs extending upwardly from said base and engaging said flange, each of said branches extending into said storage fixture, along said base and through an opening in one of said legs to form a loop behind said flange, and a fastener fixing said loop to said flange.

15. A fiber optic cable comprising a flat flexible ribbon having an integral tube formed along one edge of the ribbon to provide a cable having a single flat mounting tail extending therefrom, and a multiplicity of individual fiber optic fibers longitudinally extending in said tube.

16. A fiber optic cable according to claim 15 wherein said flat ribbon and tube are light transmitting PVC.

17. A fiber optic cable according to claim 16 wherein said light transmitting PVC is translucent.

18. A fiber optic cable according to claim 16 wherein said PVC is transparent.

19. A fiber optic cable according to claim 15 wherein said fibers are polymethyl methacrylate having a diameter of less than 0.1 inch.

20. A fiber optic cable according to claim 19 wherein said fibers have a diameter of 0.03 inch.

21. A fiber optic cable according to claim 19 wherein said flat flexible ribbon has a bend radius of less than 0.8 inch.

22. A fiber optic cable according to claim 20 wherein said flat flexible ribbon has a bend radius of 0.24 inch.

23. A fiber optic light transmitting assembly comprising a pool light fixture mounted in a pool wall beneath a level of water in said pool, a light adaptor cap comprising an end wall and a side wall mounted over a lens of said fixture and in substantial vertical alignment with a light source in said fixture, and a flexible fiber optic cable bundle having an end mounted in an opening in said end wall so that said end is in substantial axial alignment with said light source.

24. A fiber optic light transmitting assembly according to claim 23 wherein a color wheel is rotatably mounted in said cap, said color wheel having a plurality of arcuately spaced colored lenses which are selectively positioned at said opening upon rotation of said wheel.

* * * * *

UNITED STATES PATENT AND TRADEMARK OFFICE
CERTIFICATE OF CORRECTION

PATENT NO.    : 6,275,634 B1                                              Page 1 of 1
DATED         : August 14, 2001
INVENTOR(S)   : Kevin L. Potucek It is certified that error appears in the above-identified patent and that said Letters Patent is hereby corrected as shown below:

Column 6,
Line 39, delete "vertical" and insert -- axial --.

Signed and Sealed this

Eighth Day of October, 2002

Attest:

Attesting Officer

JAMES E. ROGAN
Director of the United States Patent and Trademark Office